United States Patent Office 2,995,571
Patented Aug. 8, 1961

2,995,571
2,2 - BIS - α - FLUOROPERHALOCARBYL - SUBSTITUTED POLYFLUOROOXETANES AND PROCESS FOR PREPARATION
John F. Harris, Jr., Wilmington, Del., assignor to E. I. du Pont de Nemours and Company, Wilmington, Del., a corporation of Delaware
No Drawing. Filed June 19, 1957, Ser. No. 666,760
6 Claims. (Cl. 260—333)

This invention relates to a new class of cyclic ethers, and more particularly to a new class of polyfluorocyclic ethers and to their preparation.

Cyclic ethers as a broad class are old and well recognized in the art as useful organic intermediates and as solvents and plasticizers. Generally, such ethers have been limited in their usefulness by the relatively low stability thereof. Recently a new class of perfluorocyclic ethers has been discovered. They are described and claimed in U.S. Patent 2,594,272. These ethers have from three to five ring carbons, which are totally fluorinated, and are characterized as exhibiting a high degree of chemical inertness. While these ethers represent a solution to the problem of the instability of previously known cyclic ethers, it is obvious that the usefulness thereof as intermediates is severely limited by their unusual chemical inertness.

An object of the present invention is to provide a new class of cyclic polyfluoro ethers. A particular object is to provide cyclic polyfluoro ethers which show wide versatility as chemical intermediates but at the same time exhibit excellent hydrolytic and thermal stability. A further object is provision of non-flammable cyclic ethers which exhibit outstanding resistance against thermal and oxidative degradation. Other objects will be apparent from the description of the invention given hereinafter.

The above objects are accomplished according to the present invention by providing new ethers containing three-ring carbons and one-ring oxygen with two-ring carbons adjacent to each other being completely substituted with fluorine, perfluorocarbyl, or omega-hydroperfluorocarbyl radicals, with the remaining, i.e., third, ring carbon adjacent to the ring oxygen carrying two α-fluoroperhalocarbyl radicals each having at least one omega-acidogenic halogen. The term acidogenic halogen as used herein means a halogen, the hydrohalic acid of which is a strong acid, i.e., chlorine, bromine or iodine, the hydrohalic acids of which in aqueous solution are strongly dissociated or ionized.

These new cyclic ethers are thus polyfluorooxetanes having two α-fluoroperhalocarbyl radicals each containing at least one omega-acidogenic halogen, said radicals being directly linked to ring carbon. These polyfluoropolyhalooxetanes can be described by the following structural formula:

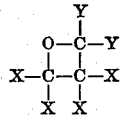

wherein the X's, which can be alike or different, are fluorine, perfluorocarbyl, or omega-hydroperfluorocarbyl radicals; and the Y's, which also can be alike or different, are α-fluoroperhalocarbyl radicals with at least one omega-acidogenic halogen.

The number of carbons in the perfluorocarbyl, omega-hydroperfluorocarbyl and the α-fluoroperhalocarbyl radicals with the omega-acidogenic halogen will generally not be more than ten carbons each. Preferably, the number of carbons in the first two radical types will not exceed eight carbons each and the radicals containing the omega-acidogenic halogen substituent are perhalo lower alkyl radicals. A preferred group of these new polyfluoropolyhalooxetanes are those wherein the acidogenic halogen is a middle halogen, that is, chlorine or bromine, and especially the former, and at least two and especially three of the X's are fluorine.

The polyfluorooxetanes of this invention range from clear, colorless liquids to low-melting solids, depending generally on the total number of carbons in the molecule. Those containing less than about 18 carbons, which are the most common, are clear, colorless liquids boiling normally from 100–300° C. They are soluble in alkanols, ethers, and various perfluorocarbon solvents, but insoluble in water and solutions containing high percentages of water.

These new polyfluoropolyhalooxetanes can be readily prepared by direct reaction under the influence of actinic light between a polyfluoroolefin and a polyfluoroketone having bonded to carbonyl carbon two α-fluoroperhalocarbyl radicals each containing at least one omega-acidogenic halogen. The oxygen of the ketone becomes the ring oxygen of the oxetane. The carbonyl carbon of the ketone becomes the 2-carbon of the oxetane, and therefore carries the necessary two α-fluoroperhalocarbyl radicals each containing at least one omega-acidogenic halogen. The two doubly bonded carbons of the polyfluoroolefin become the 3- and 4-carbons of the oxetane and the substituents thereon become therefore the substituents on the 3- and 4-ring carbons of the oxetane.

Any source of actinic light can be used. Because of improved reaction efficiency radiation sources relatively high in UV output are preferred. Generally speaking, the mercury vapor arc lamps will be used since they afford a relatively intense source of the preferred UV light. A wide variety of such lamps are available on the market, and any or all can be used, including both low and high pressure lamps with various types of glass envelopes, the most preferred of which are those with quartz envelopes since the highest percent transmission of UV is achieved thereby.

The reaction can be effected properly in the presence or absence of an inert organic reaction medium which, if present, should be anhydrous. Any inert liquid organic diluent can be used and generally speaking the most common are the normally liquid hydrocarbons and polyfluorohydrocarbons, including aliphatic and aromatic compounds such as the hexanes, heptanes, octanes, and the like; benzene, toluene, the xylenes, and the like; cycloaliphatic hydrocarbon solvents such as cyclohexane, and the like; the polyfluoro aliphatic hydrocarbons, e.g., 1,1,2,2-tetrafluoro-3,3-dimethylbutane, and the like; the polyfluoro aliphatic/cycloaliphatic hydrocarbons, e.g., perfluorodimethylcyclohexane, and the like.

The choice of the particular diluent is not at all critical and will vary with such other normal variables as the reaction temperature found necessary. In most instances, in order to simplify the reaction, no diluent is used. The acidogenic-halogen-substituted polyfluoroketones and the requisite perfluoro- or omega-hydroperfluoroolefin are mixed, irradiated with ultraviolet light for the necessary reaction time, and the products simply isolated by direct precision fractionation of the reaction mixture. The absence of a diluent generally makes the separation easier.

The condensation can be carried out at temperatures ranging from below 0 to generally no higher than 150 to 200° C., varying with the relative reactivity and the physical properties of the acidogenic-halogen-substituted polyfluoroketone and polyfluoroolefin reactants. Generally speaking, the higher temperature ranges will be avoided since operation under such conditions would usually require reaction equipment resistant to high pressures which is extremely difficult to fabricate from materials which would permit transmittal of the necessary radiation.

Alternatively, the reaction can be carried out at higher temperatures under the requisite pressures with an internal source of ultraviolet irradiation in the reactor. However, such procedures are obviously not desirable and the reaction is generally carried out in simple glass equipment at substantially room temperature, ranging up to whatever temperature is effected in the reaction zone due to thermal effects created by the radiation source. Practically speaking, since many of the shorter chain perfluoro- and omega-hydroperfluoroolefins are low boiling, the reaction zone will be maintained in the liquid condition through a reflux condenser to trap the olefin, generally using solid carbon dioxide/acetone as a cooling medium.

The pressure at which the reaction is carried out is largely immaterial and will vary as will be apparent to those skilled in the art with the specific nature of the reactants and the operating temperatures being used. Obviously for convenience, the reaction is preferably carried out in glass equipment at substantially atmospheric pressure or at pressures no greater than two to five atmospheres.

The new polyfluoropolyhalooxetanes of this invention and a process for preparation thereof are illustrated in greater detail but are not to be limited by the following more specific examples in which the parts given are by weight.

Example I

A mixture of 135 parts of hexafluoropropene and 242 parts (1.35 molar proportions based on the olefin) of sym.-dichlorotetrafluoroacetone in a cylindrical quartz reactor, approximately four diameters long, maintained at atmospheric pressure and under reflux from a solid carbon dioxide/acetone cooled condenser, was exposed to the UV light emanating from a low-pressure, ten-watt quartz, mercury "resonance" lamp fitted in a spiral around the reactor for a period of twelve days. The resulting reaction mixture was then separated by distillation. There was obtained 176.4 parts (56% of theory) of crude 2,2 - bis - (chlorodifluoromethyl) - 3 - trifluoromethyl-perfluorooxetane as a clear, colorless liquid, boiling at 105–109° C. at atmospheric pressure. Redistillation of the product through a precision Podbielniak fractionating column afforded the pure 2,2-bis(chlorodifluoromethyl)-3-trifluoromethylperfluorooxetane as a water-white liquid, boiling at 107.5° C. at atmospheric pressure; $n_D^{26}$, 1.3259; $d^{25}$, 1.7424.

Analysis.—Calc'd. for $C_6F_{10}Cl_2O$: F, 54.4%; Cl, 20.4%; M.W., 349. Found: F, 52.4%; Cl, 19.9%; M.W., 349, 368.

Examination of the infrared and nuclear magnetic resonance spectra of the product showed absorption curves consistent with the oxetane structure. The oxetane can be thermally cleaved at high temperatures (650° C.) to give hexafluoropropene, sym.-dichlorofluoroacetone (in about 35–40% of theory), and smaller amounts of carbonyl fluoride. The products of thermal cracking are likewise consistent with the oxetane structure.

Example II

A glass reactor fabricated from a high temperature resistant, high silica glass, especially transmissive of UV radiation and commercially referred to as "Vycor," was charged with 15 parts of sym.-dichlorotetrafluoroacetone, evacuated, and then pressured with hexafluoropropene to 30 lbs. gauge. The closed reactor was then exposed to the radiation from two H–85 C–3 lamps (commercially available, 85 watt/250 volt, high pressure mercury vapor lamps capable of emitting 2800 lumens of light) for a period of six days while the reactor was shaken mechanically. At the end of this time the reactor was vented to the atmosphere and the reaction mixture separated by precision fractionation through a spinning band distillation column of the type described and claimed in U.S. Patent 2,712,520. There was obtained 1.6 parts (6% of theory) of 2,2-bis(chlorodifluoromethyl)-3-trifluoromethylperfluorooxetane as a clear, colorless liquid boiling at 108° C. at atmospheric pressure; $n_D^{25}$, 1.3265.

Analysis.—Calc'd. for $C_6F_{10}Cl_2O$; F, 54.4%; Cl, 20.4. Found: F, 53.5%; Cl, 20.6.

The above synthesis was repeated four times using a total of 69.5 parts of the ketone. The reaction mixtures were batched and separated in one precision fractionation. There was thus obtained 13.1 parts (12% of theory) of 2,2-bis(chlorodifluoromethyl) - 3 - trifluoromethylperfluorooxetane.

Example III

A mixture of 59 parts of 4-hydroperfluorobutene-1 and 91 parts (1.41 molar proportions based on the olefin) of sym.-dichlorotetrafluoroacetone was irradiated under the conditions described in Example I for seven days. Precision distillation of the reaction mixture afforded 31 parts (30% of theory) of 2,2-bis(chlorodifluoromethyl) - 3 - (β-hydroperfluoroethyl)perfluorooxetane as a clear, colorless liquid boiling at 144–146.5° C. at atmospheric pressure; $n_D^{26}$, 1.3427–1.3443.

Analysis.—Calc'd. for $C_7HCl_2F_{11}O$: F, 54.8%. Found: F, 54.7%.

Example IV

A mixture of 113.0 parts of perfluoroheptene-1 and 91.0 parts (1.4 molar proportions based on the olefin) of sym.-dichlorotetrafluoroacetone was irradiated under the conditions described in Example I for a period of eight days. Precision distillation of the reaction mixture afforded 53.7 parts (47% of theory) of 2,2-bis(chlordifluoromethyl)-3-perfluoropentylperfluorooxetane as a clear, colorless liquid boiling at 179–182° C. at atmospheric pressure; $n_D^{25}$, 1.3255–1.3258. There was also recovered 21% of the starting perfluoroheptene-1.

Analysis.—Calc'd. for $C_{10}F_{18}Cl_2O$: C, 21.9%; F, 62.3%; Cl, 12.9%. Found: C, 22.4% F., F, 61.7% Cl, 12.6%.

Example V

A mixture of 75 parts of hexafluoropropene and 50 parts (0.43 molar proportion based on the olefin) of sym.-tetrachlorodifluoroacetone was irradiated under the conditions described in Example I for seven days. Precision distillation of the reaction mixture afforded 16 parts (32% recovery) of the starting sym.-tetrachlorodifluoroacetone and 15.6 parts (28% of theory) of crude 2,2-bis-(dichlorofluoromethyl)-3-trifluoromethylperfluorooxetane as a clear, colorless liquid boiling at 164–173° C. at atmospheric pressure; $n_D^{24}$, 1.3837.

Analysis.—Calc'd. for $C_6F_8Cl_4O$: F, 39.9%. Found: F, 41.2%.

A sample of the product was purified by vapor phase chromatography (frequently referred to as gas chromatography) in the manner of Evans et al., J. Chem. Soc. 1955, 1184. The pure 2,2-bis(dichlorofluoromethyl)-3-trifluoromethylperfluorooxetane was obtained as a clear, colorless liquid boiling at 171–172° C. at atmospheric pressure; $n_D^{25}$, 1.3869.

Analysis.—Cal'd. for $C_6F_8Cl_4O$: F, 39.9%; Cl, 37.1%. Found: F, 39.7%; Cl, 36.9%.

As already indicated, the present invention is generic to four-membered cyclic ethers carrying on carbon adjacent to ether oxygen two α-fluoroperhalocarbyl radicals having at least one omega-acidogenic halogen and carrying on the remaining two-ring carbons only fluorine, perfluorocarbyl, or omega-hydroperfluorocarbyl radicals. The two said α-fluoroperhalocarbyl radicals carrying at least one omega-acidogenic halogen can be alike or different and generally are of no more than about ten, and preferably no more than about eight, carbons each. Preferred, because of greater stability, are those products in which the majority of the halogen in these radicals is fluorine, and especially those wherein the radicals are completely fluoro substituted except for the necessary at least one omega-acidogenic halogen.

More specifically, the present invention is generic to a new class of polyfluorooxetanes in which the 2-carbon is completely substituted with α-fluoroperhalocarbyl radicals having at least one omega-acidogenic halogen and the 3- and 4-carbons are completely substituted with fluorine, perfluorocarbyl, and omega-hydroperfluorocarbyl radicals. All of the said substituent radicals are generally of no more than about ten, and preferably no more than eight, carbons each. Two of the radicals on the 3- and 4-carbons can be together joined to form a second ring which is carbocyclic and polyfluoro substituted, and generally of from five to seven-ring carbons.

It will be understood that the present invention is also generic to the preparation of these 2,2-bis-α-fluoroperhalocarbyl substituted polyfluorooxetanes in the presence of actinic light from polyfluoroolefins and α,α'-difluoroperhaloketones having at least one omega-acidogenic halogen in both the α-fluoroperhalocarbyl radicals attached to the ketone carbonyl group. The two α-fluoroperhalocarbyl radicals, each carrying at least one omega-acidogenic halogen, which together with the ketone carbonyl group form the ketone molecule, will in the new polyfluorooxetanes of this invention be the substituents on the 2-carbon thereof, each carrying at least one fluorine on α-carbon and at least one omega-acidogenic halogen. The ketone oxygen will be the 1-oxygen and the ketone carbonyl carbon will be the 2-carbon in the new polyfluorooxetanes. The olefinic carbons, i.e., the carbons doubly bonded to each other in the polyfluoroolefin reactant, will be the 3- and 4-ring carbons in the resultant polyfluorooxetane, and, accordingly, the substituents thereon in the olefin will be the substituents on the 3- and 4-carbons in the polyfluorooxetanes.

Thus, from the aforesaid description of the new polyfluorooxetanes, it is apparent that the ketone reactants have at least one fluorine on each α-carbon, contain solely halogen bonded to carbon other than carbonyl carbon, and contain in each radical pendent on the carbonyl carbon no more than ten carbons, and preferably no more than eight carbons, with at least one omega-acidogenic halogen in each said radical. Similarly, the olefin reactant has an olefinic carbon, i.e., carbon involved in ethylenic linkage to an adjacent carbon, solely fluorine, perfluorocarbyl, and omega-hydroperfluorocarbyl radicals, both the latter being of no more than ten carbons each and generally no more than eight carbons each.

There can be used in the process of this invention any wholly carbon chain perhalogenoketone wherein each of the α-carbons, i.e., the two carbons immediately linked to the ketone carbonyl carbon, carries at least one fluorine atom and wherein each of the wholly carbon chain perhalocarbyl radicals, which with the ketone carbonyl form the ketone structure, carries at least one omega-acidogenic halogen. Particularly outstanding because of their being more readily available are such ketones which are aliphatic in character, i.e., aliphatic, cycloaliphatic, or mixed aliphatic/cycloaliphatic ketones, having the requisite halogeno substituents. The polyfluoroketones wherein the acidogenic halogens are chlorine are most readily available and are therefore preferred. For the formation of the new polyfluorooxetanes wherein the acidogenic halogens in the 2-substituents are bromine, it is normally more convenient to use the chloropolyfluoroketones because of the relative inaccessibility of the bromofluoroketones and to form the resultant chloropolyfluorooxetane, and then by simple metathesis with an alkali metal bromide, such as sodium bromide, to introduce the desired acidogenic bromine substituents. Suitable additional examples of these polyfluoroketones carrying the necessary acidogenic halogen include sym.-dibromotetrafluoroacetone, sym.-dichlorotetrafluoroacetone, tetrachlorodifluoroacetone, and the like.

As indicated above, the materials to be reacted with the aforesaid described acidogenic halogen substituted polyfluoroketones are the perfluoro- or omega-hydroperfluoroolefins, and especially the monoolefins, containing a wholly carbon aliphatic chain which can be cyclic or acyclic. Generally the latter type is preferred because it is more readily available. Suitable specific illustrations of these polyfluoroolefins include the perfluorocarbon olefins, straight chain in nature, such as tetrafluoroethylene, hexafluoropropene, perfluoropentene-1, perfluorohexene-1, perfluoroheptene-1, all of which contain terminal carbon-carbon ethylenic unsaturation; the acyclic wholly carbon chain perfluoroolefins containing internal carbon-carbon unsaturation, such as perfluorobutene-2; the wholly carbon chain perfluoroolefins containing a plurality of carbon-carbon unsaturation, such as perfluoro-1,3-butadiene; the cyclic perfluoroolefins, in particular the perfluoromonoolefins, such as perfluorocyclohexene; the wholly carbon chain acyclic omega-hydroperfluoroolefins, such as omega-hydroperfluorobutene - 1, omega-hydroperfluorohexene-1, omega-hydroperfluorooctene-1, omega-hydroperfluorodecene-1, omega-hydroperfluorododecene-1, and the like. The carbon chain of the perfluoro- and omega-hydroperfluoroolefins will generally not exceed 12 carbons. The substituents on the ethylenic carbon become the substituents on the 3- and/or 4-carbon of the new polyfluorooxetanes, and, accordingly, the carbon chain of the radicals pendent on these 3- and 4-ring carbons will not exceed about 10 carbons.

Suitable further specific illustrations of the new polyfluorooxetanes of this invention, in addition to those given in detail in the foregoing examples, can be obtained by reacting an acidogenic-halogen-substituted perfluoroketone with an appropriate perfluoro- and omega-hydroperfluoroolefin in the manner set forth in detail above. Thus, from sym.-dichlorotetrafluoroacetone and tetrafluoroethylene, one can obtain 2,2-bis(chlorodifluoromethyl)perfluorooxetane; from sym.-tetrachlorodifluoroacetone and hexafluoropropene, 2,2-bis(dichlorofluoromethyl)-3-trifluoromethylperfluorooxetane; from sym.-dichlorotetrafluoroacetone and omega-hydroperfluorohexene-1, 2,2-bis(chlorodifluoromethyl) - 3 - (omega-hydroperfluorobutyl)perfluorooxetane; from sym.-dichlorotetrafluoroacetone and perfluoroheptene-1, 2,2-bis(chlorodifluoromethyl)-3-perfluoropentylperfluorooxetane; from sym.-tetrachlorodifluoroacetone and omega-hydroperfluorodecene-1, 2,2-bis(dichlorofluoromethyl) - 3 - (omega-hydroperfluorooctyl)-perfluorooxetane; from sym.-dichlorotetrafluoroacetone and perfluorobutene-2, 2,2-bis(chlorodifluoromethyl)-3,4-bis(trifluoromethyl)perfluorooxetane; from sym.-dichlorotetrafluoroacetone and perfluorobutadiene-1,3, 2,2-bis-(chlorodifluoromethyl) - 3 - perfluorovinylperfluorooxetane; from sym.-dichlorotetrafluoroacetone and perfluorocyclohexene, 2,2-bis(chlorodifluoromethyl)-3,4-perfluorotetramethyleneperfluorooxetane, which can also be termed 7 - oxabicyclo[4.2.0] - 8,8 - bis(chlorodifluoromethyl)perfluorooctane; from sym.-tetrachlorodifluoroacetone and perfluorobutene-2, 2,2-bis(dichlorofluoromethyl)-3,4-bis-(trifluoromethyl)perfluorooxetane; from sym.-tetrachlorodifluoroacetone and omega-hydroperfluorodecene-1, 2,2-bis(dichlorofluoromethyl) - 3 - (omega-hydroperfluorooctyl)perfluorooxetane; from sym.-tetrachlorodifluoroacetone and perfluoroheptene - 1, 2,2 - bis(dichlorofluoromethyl)-3-perfluoropentylperfluorooxetane; from sym.-tetrachlorodifluoroacetone and perfluoro-1,3-butadiene, 2,2 - bis(dichlorofluoromethyl) - 3 - perfluorovinylperfluorooxetane; from sym.-dichlorotetrafluoroacetone and perfluorohexene - 1, 2,2-bis(chlorodifluoromethyl)-3-perfluorobutylperfluorooxetane which, by metathesis with sodium bromide, can be converted to 2,2-bis(bromodifluoromethyl)-3-perfluorobutylperfluorooxetane.

All of the compounds of this invention are nonflammable and exhibit high hydrolytic stability, both under aqueous acid and aqueous base conditions as well as outstanding resistance against thermal and oxidative degradation. For instance, the oxetane of Example I as representative of this class was stable when heated at the reflux for seven days with a stream of air blowing through the liquid as judged by the lack of any visible coloration and no appreciable change in $n_D^{25}$ (initial 1.3257; final 1.3260). These compounds are thus useful as "stable liquid" materials, e.g., as transformer fluids, fluids for high temperature power transmissions, or hydraulic systems, or liquid-coupled mechanical drives.

As many apparently widely different embodiments of this invention may be made without departing from the spirit and scope thereof, it is to be understood that the invention is not limited to the specific embodiments thereof except as defined in the appended claims.

The embodiments of the invention in which an exclusive property or privilege is claimed are defined as follows:

1. A polyfluorooxetane of the formula

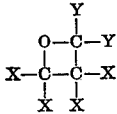

wherein X is a member of the group consisting of fluorine, straight chain aliphatic perfluorocarbyl radicals of 1–10 carbon atoms, straight chain aliphatic omega-hydroperfluorocarbyl radicals of 1–10 carbon atoms and perfluorocarbocyclic rings of 5–7 carbon atoms formed by the joining of two X's on different carbon atoms, and Y represents an α-fluoro-substituted lower alkyl radical consisting of carbon, fluorine and 1 to 2 omega-halogens of the group consisting of chlorine and bromine.

2. A process for preparing a polyfluorooxetane of the formula

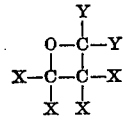

wherein X is a member of the group consisting of fluorine, straight chain aliphatic perfluorocarbyl radicals of 1–10 carbon atoms, straight chain aliphatic omega-hydroperfluorocarbyl radicals of 1–10 carbon atoms and perfluorocarbocyclic rings of 5–7 carbon atoms formed by the joining of two X's on different carbon atoms, and Y represents an α-fluoro-substituted lower alkyl radical consisting of carbon, fluorine and 1 to 2 omega-halogens of the group consisting of chlorine and bromine, which comprises exposing to actinic light a mixture of a polyfluoroketone, of the formula

wherein Y is as defined above, with a polyfluoroolefin of the formula

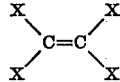

wherein X is as defined above, so as to produce said 2,2-bis-α-fluoroperhalocarbyl-substituted polyfluorooxetanes.

3. 2,2 - bis(chlorodifluoromethyl) - 3 - trifluoromethyl-perfluorooxetane.

4. 2,2 - bis(chlorodifluoromethyl) - 3 - (β - hydroperfluoroethyl)perfluorooxetane.

5. 2,2 - bis(chlorodifluoromethyl) - 3 - perfluoropentyl-perfluorooxetane.

6. 2,2 - bis(dichlorofluoromethyl) - 3 - trifluoromethyl-perfluorooxetane.

References Cited in the file of this patent

UNITED STATES PATENTS

| | | |
|---|---|---|
| 2,368,186 | Wickert et al. | Jan. 30, 1945 |
| 2,392,294 | Rust et al. | Jan. 1, 1946 |
| 2,473,497 | Bortnick | June 21, 1949 |
| 2,522,590 | Vaughan et al. | Sept. 19, 1950 |
| 2,594,272 | Kauck | Apr. 29, 1952 |

FOREIGN PATENTS

| | | |
|---|---|---|
| 718,318 | Great Britain | Nov. 10, 1954 |

OTHER REFERENCES

A. Schonberg et al.: Berichte, vol. 66, 1933, pages 567–571.

G.A.R. Band et al.: J. Chem. Soc. (London), 1952, pages 2198–2205.

J. D. Park et al.: J. Am. Chem. Soc., vol. 76, 1954, pages 1387–1388.